US010505887B2

(12) United States Patent
He et al.

(10) Patent No.: US 10,505,887 B2
(45) Date of Patent: Dec. 10, 2019

(54) INFORMATION PUSHING METHOD, APPARATUS, AND SYSTEM

(71) Applicant: TENCENT TECHNOLOGY (SHENZHEN) COMPANY LIMITED, Shenzhen (CN)

(72) Inventors: Ruiming He, Shenzhen (CN); Yuan Tian, Shenzhen (CN)

(73) Assignee: TECENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 164 days.

(21) Appl. No.: 15/860,454

(22) Filed: Jan. 2, 2018

(65) Prior Publication Data
US 2018/0131661 A1  May 10, 2018

Related U.S. Application Data

(63) Continuation of application No. PCT/CN2016/096558, filed on Aug. 24, 2016.

(30) Foreign Application Priority Data

Sep. 11, 2015 (CN) .......................... 2015 1 0579912

(51) Int. Cl.
  *H04L 12/58* (2006.01)
  *G06F 7/02* (2006.01)
  (Continued)

(52) U.S. Cl.
  CPC ............... *H04L 51/32* (2013.01); *G06F 7/02* (2013.01); *H04L 51/14* (2013.01); *H04L 67/22* (2013.01);
  (Continued)

(58) Field of Classification Search
  CPC ......... H04L 51/32; H04L 51/14; H04L 67/22; H04L 67/26; G06F 7/02; H04M 1/72552
  (Continued)

(56) References Cited

U.S. PATENT DOCUMENTS

2013/0346545 A1* 12/2013 Petersen ................. H04L 67/10
  709/217
2014/0359466 A1* 12/2014 Wan ....................... H04L 51/043
  715/739

(Continued)

FOREIGN PATENT DOCUMENTS

CN   102637183 A   8/2012
CN   102937995 A   2/2013
(Continued)

OTHER PUBLICATIONS

The State Intellectual Property Office of the People's Republic of China (SIPO) Office Action 1 for 201510579912.3 dated Dec. 21, 2017 6 Pages (including translation).

(Continued)

*Primary Examiner* — Glenford J Madamba
(74) *Attorney, Agent, or Firm* — Anova Law Group, PLLC

(57) ABSTRACT

The present disclosure provides an information pushing method, server, and storage medium. The method includes: obtaining first behavioral data of a user account, the first behavioral data comprising a first quantity of active behaviors and a first quantity of passive behaviors of the user account; calculating a first activity level score of the user account according to the first behavioral data; detecting whether the first activity level score of the user account is less than a preset threshold; if the first activity level score of the user account is less than the preset threshold, calculating a friend activity level score of each friend account in a friend list of the user account; and pushing related information of (Continued)

a target friend account whose friend activity level score meets a preset condition to the user account.

14 Claims, 7 Drawing Sheets

(51) Int. Cl.
  *H04L 29/08* (2006.01)
  *H04M 1/725* (2006.01)
  *G06Q 50/00* (2012.01)

(52) U.S. Cl.
  CPC ........ *H04L 67/26* (2013.01); *H04M 1/72552* (2013.01); *G06Q 50/01* (2013.01); *H04L 67/306* (2013.01); *H04M 1/72522* (2013.01)

(58) Field of Classification Search
  USPC .......................................................... 709/206
  See application file for complete search history.

(56) References Cited

U.S. PATENT DOCUMENTS

2015/0244664 A1   8/2015  Kendal
2017/0289304 A1*  10/2017 Yao .......................... H04L 51/32

FOREIGN PATENT DOCUMENTS

| CN | 102957727 A | 3/2013 |
| CN | 104468667 A | 3/2015 |
| CN | 104679969 A | 6/2015 |
| CN | 105245577 A | 1/2016 |
| WO | 2015039578 A1 | 3/2015 |

OTHER PUBLICATIONS

The World Intellectual Property Organization (WIPO) International Search Report for PCT/CN2016/096558 dated Nov. 30, 2016 5 Pages (including translation)

* cited by examiner

INFORMATION PUSHING METHOD, APPARATUS, AND SYSTEM

CROSS-REFERENCES TO RELATED APPLICATIONS

This application is a continuation application of PCT Patent Application No. PCT/CN2016/096558, filed on Aug. 24, 2016, which claims priority to Chinese Patent Application No. 201510579912.3, entitled "INFORMATION PUSHING METHOD, APPARATUS, AND SYSTEM" filed with the Chinese Patent Office on Sep. 11, 2015, the entire contents of both of which are incorporated herein by reference.

FIELD OF THE TECHNOLOGY

Embodiments of the present disclosure relate to the field of Internet technologies and, in particular, relate to an information pushing method, apparatus, and system.

BACKGROUND OF THE DISCLOSURE

An activity level refers to a frequency that a user uses an APP (Application, application) product within a time period. In the existing technology, an activity level of a user account whose activity level is low is improved by pushing information. Specifically, a server collects user accounts whose activity levels are low, and pushes information to these user accounts in a uniformed manner. The information being pushed may be some pieces of recent hot news, operated activities, entertainment information, or the like that is expected to be capable of drawing attention of the users, to improve the activity levels of the users.

During implementation of embodiments of the present disclosure, the inventor finds that the existing technology has at least the following problem.

Because a relatively few types of information are pushed by a server to user accounts, it is difficult to meet interests and hobbies of all users, and a large amount of pushed information is accessed for a very few times. When the pushed information is accessed for a very few times, an activity level of a user cannot be correspondingly improved, and resources of the server are wasted to some degree due to the pushed information.

SUMMARY

Because information of a relatively few types is pushed to a user account by a server, it is difficult to meet interests and hobbies of all users, leading to that a large amount of the pushed information is accessed for a very few times, and an activity level of a user cannot be improved and resources of the server are wasted. To resolve this problem, embodiments of the present disclosure provide an information pushing method, apparatus, and system. The technical solutions are as follows:

According to one aspect of the embodiments of the present disclosure, an information pushing method is provided. The method can be applied to a server including at least a processor and a memory. The method includes: obtaining first behavioral data of a user account, the first behavioral data comprising a first quantity of active behaviors and a first quantity of passive behaviors of the user account; calculating a first activity level score of the user account according to the first behavioral data; detecting whether the first activity level score of the user account is less than a preset threshold; if the first activity level score of the user account is less than the preset threshold, calculating a friend activity level score of each friend account in a friend list of the user account; and pushing related information of a target friend account whose friend activity level score meets a preset condition to the user account.

According to another aspect of the embodiments of the present disclosure, a server is provided, where the server includes: a processor, a memory, and a network interface unit, the memory storing one or more program instructions, and the processor being configured to execute the one or more program instructions; the network interface unit being configured to obtain first behavioral data of a user account, the first behavioral data comprising a first quantity of active behaviors and a first quantity of passive behaviors of the user account; the processor being configured to calculate a first activity level score of the user account according to the first behavioral data; detect whether the first activity level score of the user account is less than a preset threshold; and if the first activity level score of the user account is less than the preset threshold, calculate a friend activity level score of each friend account in a friend list of the user account; and the network interface unit being configured to push related information of a target friend account whose friend activity level score meets a preset condition to the user account.

According to another aspect of the present disclosure, a non-transitory computer-readable storage medium is provided. The storage medium contains computer-executable program for, when being executed by a processor, implementing an information pushing method, the method including: obtaining first behavioral data of a user account, the first behavioral data comprising a first quantity of active behaviors and a first quantity of passive behaviors of the user account; calculating a first activity level score of the user account according to the first behavioral data; detecting whether the first activity level score of the user account is less than a preset threshold; if the first activity level score of the user account is less than the preset threshold, calculating a friend activity level score of each friend account in a friend list of the user account; and pushing related information of a target friend account whose friend activity level score meets a preset condition to the user account.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
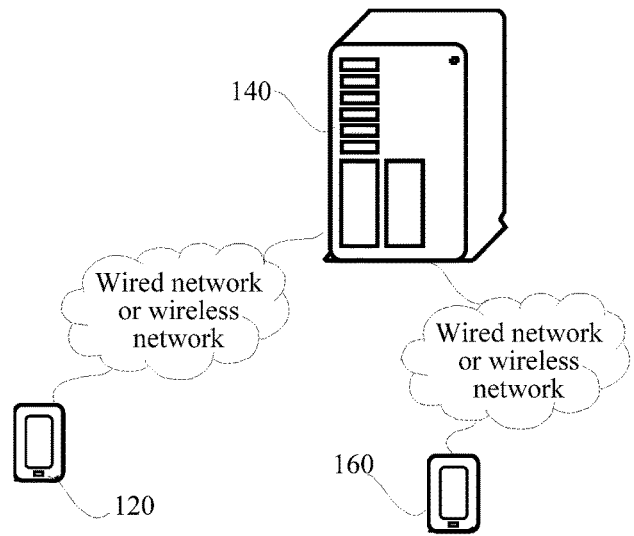
FIG. 1 is a schematic structural diagram of an implementation environment according to an embodiment of the present disclosure.

Referring to FIG. 1, FIG. 1 is a schematic structural diagram of an implementation environment according to an embodiment of the present disclosure. The implementation environment includes a client 120, a server 140, and a friend account client 160.

The client 120 may be a mobile phone, a tablet computer, an e-book reader, a moving picture experts group audio layer III (MP3) player, a moving picture experts group audio layer IV (MP4) player, a portable laptop computer, a desktop computer, or the like. A communication application is installed in the client 120, and the communication application may be an instant messaging program, a social application, or a voice call program. For example, the communication application is an instant messaging program such as QQ, microblog, or WeChat.

The client 120 may communicate with the friend account client 160 by using the installed communication application.

The server 140 may be a server, a server cluster formed by multiple servers, or a cloud computing center. The server 140 is connected to the client 120 by using a wireless network or a wired network, and is connected to the friend account client 160 by using a wireless network or a wired network.

A friend relationship exists between a user account of the client 120 and a user account of the friend account client 160. The friend relationship is a generalized friend relationship, that is, it may be considered that a friend relationship exists provided that a communication relationship exists between two clients. For example, if a user account A adds a user account B as a contact, it is considered that a friend relationship exists between the user account A and the user account B. For another example, if the user account A and the user account B belong to a same group, but the user account A and the user account B have not added each other as contacts, it is also considered that a friend relationship exists between the user account A and the user account B. For still another example, if the user account A follows the user account B, but the user account A and the user account B have not added each other as contacts, it is also considered that a friend relationship exists between the user account A and the user account B.

Figure 2:
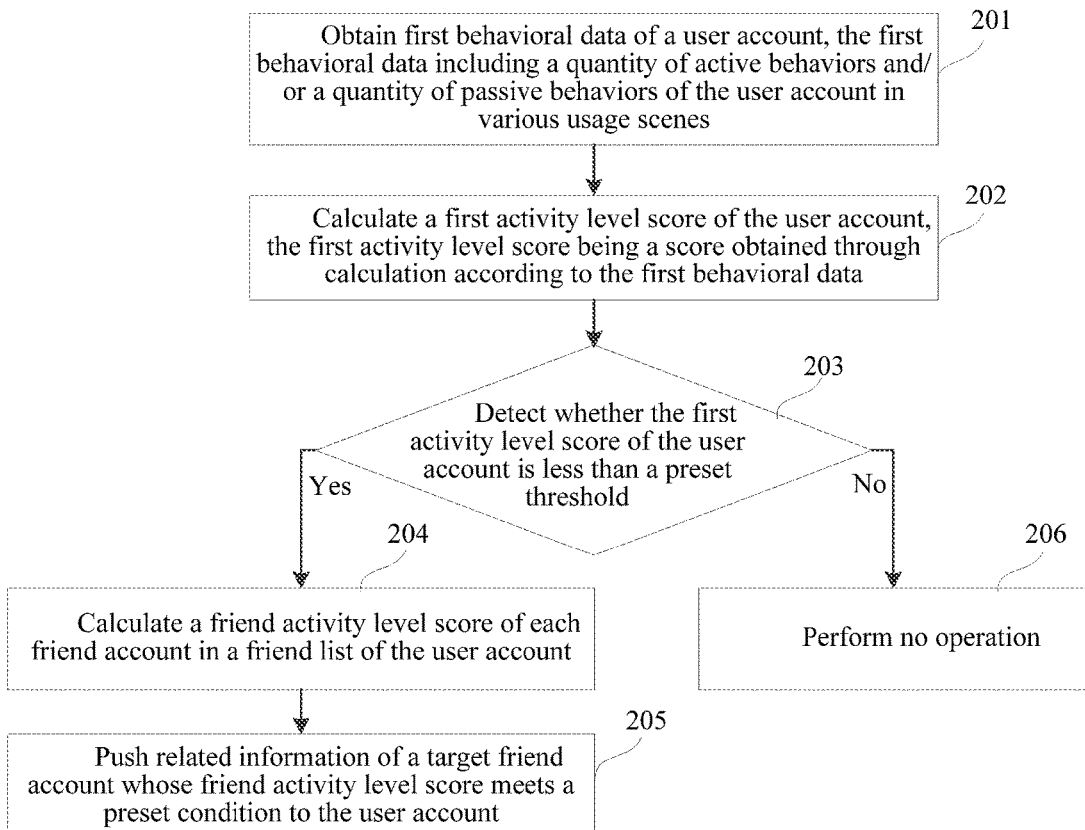
FIG. 2 is a method flowchart of an information pushing method according to an embodiment of the present disclosure.

Referring to FIG. 2, FIG. 2 is a method flowchart of an information pushing method according to an embodiment of the present disclosure. This embodiment gives descriptions by using an example in which the information pushing method is applied to the implementation environment shown in FIG. 1. The method includes the following steps:

Step 201: Obtain first behavioral data of a user account, the first behavioral data including a quantity of active behaviors and/or a quantity of passive behaviors of the user account in various usage occasions. For example, a client terminal is installed with an application logged in with the user account. The behavioral data is collected and accumulated as the user account operates various functions and services provided by the application. The client terminal may communicate with an application server to provide the various functions and services.

Optionally, the various usage occasions include: a scene/occasion in which information is sent to/received from a specified object, for example, in which information is sent to/received from in a private chat session, in a group chat session, or via a drift bottle; and a scene in which information is sent to/received from an unspecified object, such as a scene of Moments in a WeChat application, a scene of a QQ zone in a QQ application, a scene in a microblog application, or a scene in a Post Bar application.

The Moments or the QQ zone is a social network information sharing platform. When a user account A publishes a message on the social network information sharing platform, a user account B that has a friend relationship with the user account A can view the message. Optionally, the user account A can further perform permission control on the user account B. The user account B, even if having a friend relationship with the user account A, cannot view the message published by the user account A on the social network information sharing platform if is not authorized.

A Post Bar is a forum that is categorized according to themes. A sub-forum that corresponds to each theme forms a Post Bar.

A server obtains the quantity of active behaviors and/or the quantity of passive behaviors of the user account in the various usage occasions.

An active behavior refers to a behavior that generates information in a usage occasion in an active manner. A passive behavior refers to a behavior caused in a usage occasion according to information that is generated by another user account.

Optionally, the active behavior may include: a behavior of sending information to a specified object, such as sending information to a friend privately, sending information in a group chat session, or sending a drift bottle; and a behavior of sending information to an unspecified object, such as sending a post in Moments, sending a post in a QQ zone, sending a post in a microblog, or publishing a topic in a Post Bar.

Optionally, the passive behavior may include: a behavior of receiving information sent by a specified object, such as receiving information sent by a friend, receiving information in a group chat session, or receiving a drift bottle; and a behavior of receiving information sent by an unspecified object, such as browsing a post in Moments, browsing a post in a QQ zone, browsing a post in a microblog, browsing a topic in a Post Bar, or publishing a comment on a post or on a topic.

Step 202: Calculate a first activity level score of the user account, the first activity level score being a score obtained through calculation according to the first behavioral data.

The server obtains, through calculation according to the obtained first behavioral data, the first activity level score that corresponds to the user account.

Step 203: Detect whether the first activity level score of the user account is less than a preset threshold.

After obtaining the first activity level score of the user account through calculation, the server compares the first activity level score that is obtained through calculation with the preset threshold, to detect whether the first activity level score that is obtained through calculation is less than the preset threshold.

Step 204: If the first activity level score of the user account is less than the preset threshold, calculate a friend activity level score of each friend account in a friend list of the user account.

When the first activity level score of the user account is less than the preset threshold, the server calculates, by obtaining the first behavioral data of each friend account in the friend list of the user account, the friend activity level score of each friend account.

Step 205: Push related information of a target friend account whose friend activity level score meets a preset condition to the user account.

After obtaining the friend activity level score of each friend account through calculation, the server finds out the target friend account by using the preset condition, and further obtains the related information of the target friend account, and pushes the related information of the target friend account to the user account.

Step 206: If the first activity level score of the user account is greater than the preset threshold, perform no operation.

Based on the above, in the information pushing method provided in this embodiment, first behavioral data of a user account is obtained by a server; a first activity level score of the user account is calculated; whether the first activity level score of the user account is less than a preset threshold is detected; if the first activity level score of the user account is less than the preset threshold, a friend activity level score of each friend account in a friend list of the user account is calculated; and related information of a target friend account whose friend activity level score reaches a preset condition is pushed to the user account. Therefore, a problem is resolved that because information of a relatively few types is pushed to a user account by a server, it is difficult to meet interests and hobbies of all users, leading to that a large amount of the pushed information is accessed for a very few times, and an activity level of a user cannot be improved and resources of the server are wasted. Related information of a target friend list is pushed to a user account according to a social network attribute of the user account, so that access times of the pushed information are increased and an activity level of a user is improved, and resources of a server are prevented from being wasted.

Figure 3:
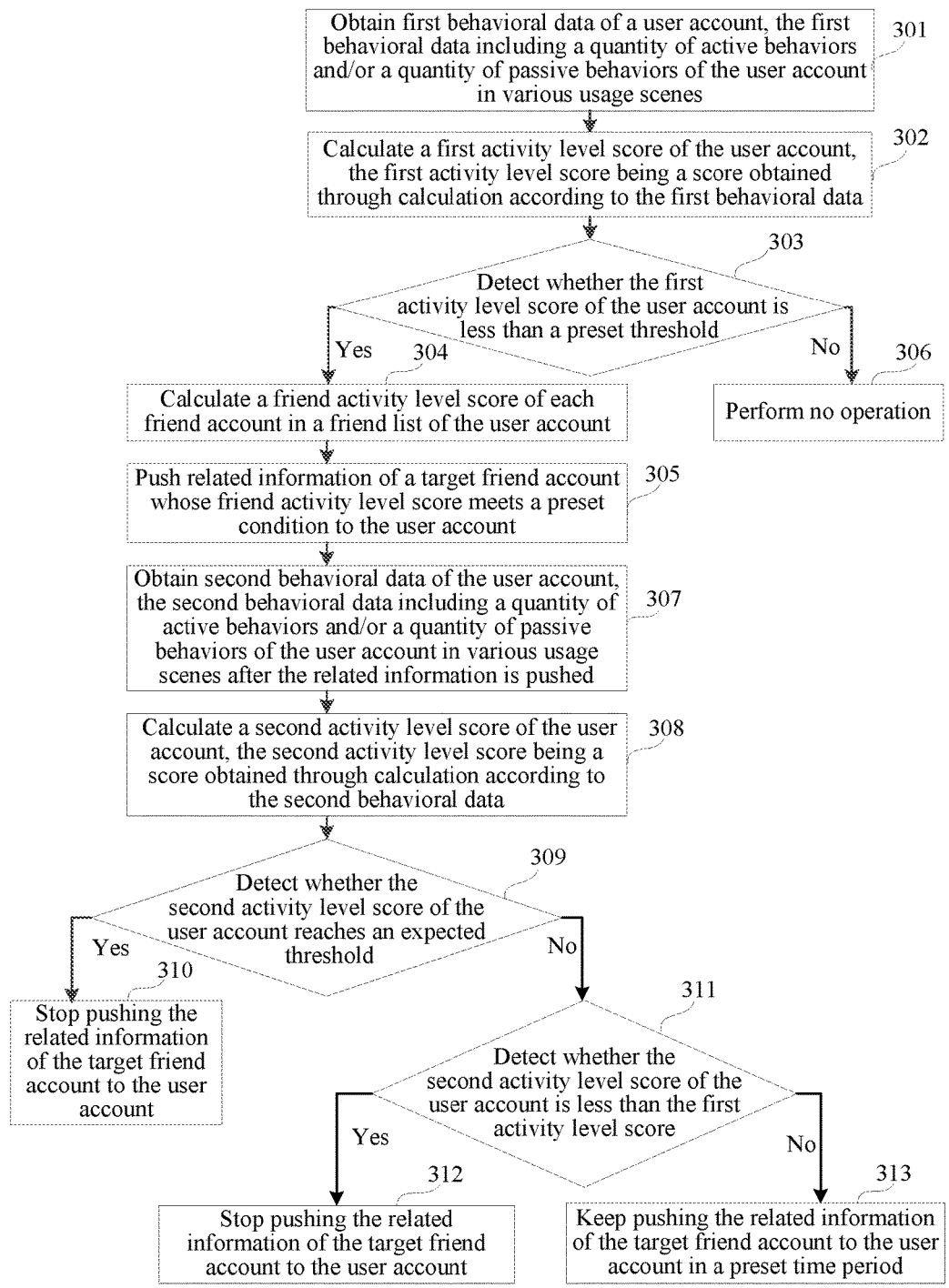
FIG. 3 is a method flowchart of an information pushing method according to another embodiment of the present disclosure.

Referring to FIG. 3, FIG. 3 is a method flowchart of an information pushing method according to another embodiment of the present disclosure. This embodiment gives descriptions by using an example in which the information pushing method is applied to the implementation environment shown in FIG. 1. The method includes the following steps.

Step 301: Obtain first behavioral data of a user account, the first behavioral data including a quantity of active behaviors and/or a quantity of passive behaviors of the user account in various usage occasions.

Optionally, the various usage occasions may include: a scene in which information is sent to/received from a specified object, for example, in which information is sent to/received from in a private chat session, in a group chat session, or via a drift bottle; and a scene in which information is sent to/received from an unspecified object, such as a scene of Moments in a WeChat application, a scene of a QQ zone in a QQ application, a scene in a microblog application, a scene in a Post Bar application. A server obtains the quantity of active behaviors and/or the quantity of passive behaviors of the user account in the various usage occasions.

An active behavior refers to a behavior of generating information by a current user account in a usage occasion in an active manner. A passive behavior refers to a behavior of causing a current user account to generate information according to information generated by another user account in a usage occasion.

Optionally, the active behavior may include: a behavior of sending information to a specified object, such as sending information to a friend privately, sending information in a group chat session, or sending a drift bottle; and a behavior of sending information to an unspecified object, such as sending a post in Moments, sending a post in a QQ zone, sending a post in a microblog, or publishing a topic in a Post Bar.

Optionally, the passive behavior may include: a behavior of receiving information sent by a specified object, such as receiving information sent by a friend, receiving information in a group chat session, or receiving a drift bottle; and a behavior of receiving information sent by an unspecified object, such as browsing a post in Moments, browsing a post in a QQ zone, browsing a post in a microblog, browsing a topic in a Post Bar, or publishing a comment on a post or on a topic.

Step 302: Calculate a first activity level score of the user account, the first activity level score being a score obtained through calculation according to the first behavioral data.

The server obtains, through calculation according to the obtained first behavioral data, the first activity level score that corresponds to the user account.

Step 303: Detect whether the first activity level score of the user account is less than a preset threshold.

After obtaining the first activity level score of the user account through calculation, the server compares the first activity level score that is obtained through calculation with the preset threshold, to detect whether the first activity level that is obtained through calculation is less than the preset threshold.

Optionally, the preset threshold is an average value of first activity level scores of all user accounts in the server, or is an average value of friend activity level scores of friend accounts in the friend list of the user account.

Step 304: If the first activity level score of the user account is less than the preset threshold, calculate a friend activity level score of each friend account in a friend list of the user account.

When the first activity level score of the user account is less than the preset threshold, the server first obtains the friend list of the user account, then obtains the first behavioral data of each friend account in the friend list, and finally calculates the friend activity level score of each friend account.

Optionally, the method of calculating the friend activity level score of each friend account is the same as the calculation method in step 302. Alternatively, the friend activity level score of each friend account is calculated by using another calculation method.

Step 305: Push related information of a target friend account whose friend activity level score meets a preset condition to the user account.

After obtaining the friend activity level score of each friend account through calculation, the server finds out the target friend account by using the preset condition, and further obtains the related information of the target friend account, and pushes the related information of the target friend account to the user account.

Optionally, the target friend account is: a friend account whose friend activity level score is the highest in the friend list, a friend account whose friend activity level score, if ranked in descending order, is top three in the friend list, a friend account whose friend activity level score, if ranked in descending order, is top ten in the friend list, or the like.

Optionally, the related information includes at least one of a profile photo of the target friend account, a nickname of the target friend account, an account identifier of the target friend account, a personalized signature of the target friend account, active behavior information of the target friend account, or passive behavior information of the target friend account.

Optionally, it is assumed that the target friend account is the friend account whose friend activity level score is the highest in the friend list. When the target friend account has an active behavior or has a passive behavior, the server obtains active behavior information or passive behavior information of the target friend account, and pushes the active behavior information or the passive behavior information to the user account.

Figure 4:
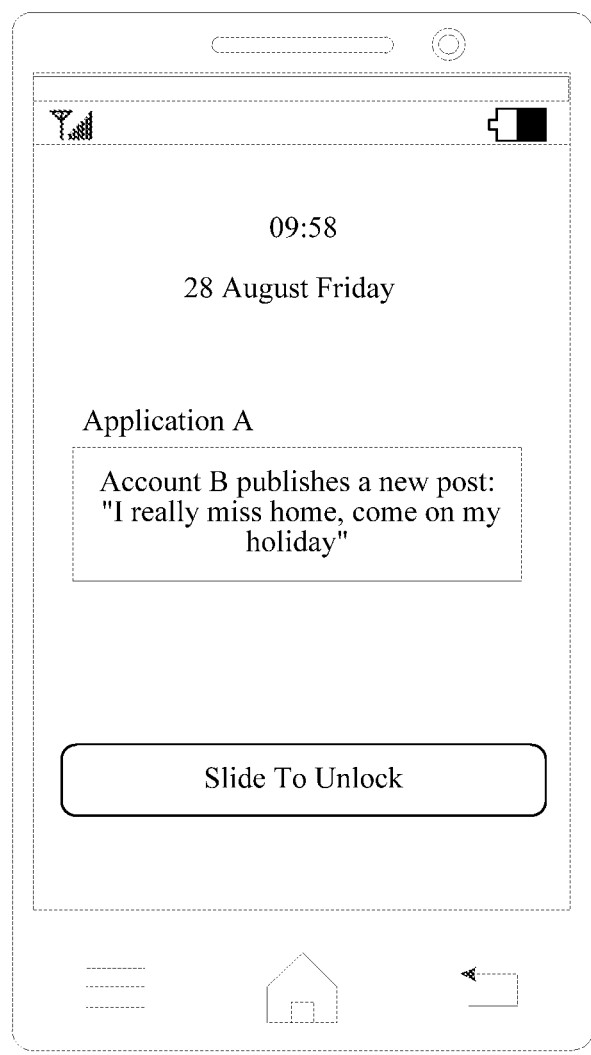
FIG. 4 is a schematic diagram of an interface for displaying a result of an information pushing method according to an embodiment of the present disclosure.

For example, the user account is an account A, the target friend account is an account B. It is assumed that, recently, the account B often publishes a post by using an application A. When the account B publishes a post "I really miss home, come on my holiday", the server obtains the post published by the account B, and pushes the post to the account A. Information "the account B has published a new post 'I really miss home, come on my holiday'" is displayed on a client of the account A. As shown in FIG. 4.

Optionally, it is assumed that the target friend account is the friend account whose friend activity level score is the highest in the friend list. When the target friend account has an active behavior or has a passive behavior, the server obtains a profile photo of the target friend account, and pushes the profile photo to the user account.

For example, the user account is an account A, the target friend account is an account B. It is assumed that, recently, the account B often publishes a post by using an application A. When the account B publishes a post "I really miss home, come on my holiday", the server obtains a profile photo of the account B, and pushes the profile photo of the account B to the account A. The profile photo of the account B is displayed on a client of the account A, and the account A is further informed that the account B in the friend list has published a new post.

Step 306: If the first activity level score of the user account is greater than the preset threshold, perform no operation.

Step 307: Obtain second behavioral data of the user account, the second behavioral data including a quantity of active behaviors and/or a quantity of passive behaviors of the user account in various usage occasions after the related information is pushed.

After the related information of the target friend account is pushed to the user account for a period of time, the server obtains the second behavioral data of the user account again. The second behavioral data refers to: after the related information is pushed for a period of time, the quantity of active behaviors and/or the quantity of passive behaviors of the user account in the various usage occasions.

Optionally, the various usage occasions may include: a scene in which information is sent to/received from a specified object, for example, in which information is sent to/received from in a private chat session, in a group chat session, or via a drift bottle; and a scene in which information is sent to/received from an unspecified object, such as a scene of Moments in a WeChat application, a scene of a QQ zone in a QQ application, a scene in a microblog application, a scene in a Post Bar application.

The active behaviors and/or the passive behaviors in the various usage occasions are the same as that in step 301.

Step 308: Calculate a second activity level score of the user account, the second activity level score being a score obtained through calculation according to the second behavioral data.

The server obtains, through calculation according to the obtained second behavioral data, the second activity level score that corresponds to the user account. The second activity level score refers to an activity level score of the user account after receiving the related information that is pushed for a period of time.

Step 309: Detect whether the second activity level score of the user account reaches an expected threshold.

After obtaining the second activity level score of the user account through calculation, the server compares the second activity level score that is obtained through calculation with the expected threshold, to detect whether the second activity level score that is obtained through calculation is less than the expected threshold.

Optionally, the expected threshold is greater than the first activity level score by 5%, 10%, 15%, or the like.

Optionally, the expected threshold is any positive number that is greater than the first activity level score.

Step 310: If the second activity level score of the user account reaches the expected threshold, stop pushing the related information of the target friend account to the user account.

If the second activity level score reaches the expected threshold, that is, the pushed related information of the target friend account improves the activity level of the user account, and the activity level score of the user account reaches the expected threshold, the server stops to continually push the related information of the target friend account to the user account.

Step 311: If the second activity level score of the user account does not reach the expected threshold, detect whether the second activity level score of the user account is less than the first activity level score.

If the second activity level score of the user account does not reach the expected threshold, the server compares the second activity level score with the first activity level score of the user account, to detect whether the second activity level score that is obtained through calculation is less than the first activity level score.

Step 312: If the second activity level score of the user account is less than the first activity level score, stop pushing the related information of the target friend account to the user account.

If the second activity level score of the user account is less than the first activity level score, it indicates that the related information that is of the target friend account and that is pushed by the server does not improve the activity level of the user account, and on the contrary, reduces the activity level of the user account. In this case, the server stops to continually push the related information of the target friend account to the user account.

Step 313: If the second activity level score of the user account is greater than the first activity level score, keep pushing the related information of the target friend account to the user account within a preset time period.

If the second activity level score of the user account is greater than the first activity level score, it indicates that the related information that is of the target friend account and that is pushed by the server improves the activity level of the user account to some degree. In this case, the server may continually push the related information of the target friend account to the user account within a preset time period.

Optionally, step 306 to step 312 are continually performed after a preset time period.

Based on the above, in the information pushing method provided in this embodiment, first behavioral data of a user account is obtained by a server; a first activity level score of the user account is calculated; whether the first activity level score of the user account is less than a preset threshold is detected; if the first activity level score of the user account is less than the preset threshold, a friend activity level score of each friend account in a friend list of the user account is calculated; and related information of a target friend account whose friend activity level score reaches a preset condition is pushed to the user account. Therefore, a problem is resolved that because information of a relatively few types is pushed to a user account by a server, it is difficult to meet interests and hobbies of all users, leading to that a large amount of the pushed information is accessed for a very few times, and an activity level of a user cannot be improved and resources of the server are wasted. Related information of a target friend list is pushed to a user account according to a social network attribute of the user account, so that access times of the pushed information are increased and an activity level of a user is improved, and resources of a server are prevented from being wasted.

When the second activity level score of the user account reaches the expected threshold or when the second activity level score of the user account is less than the first activity level score, the server stops pushing the related information of the target friend account to the user account, so that harassment on the user account is reduced, and resources of the server are prevented from being wasted at the same time.

Figure 5:
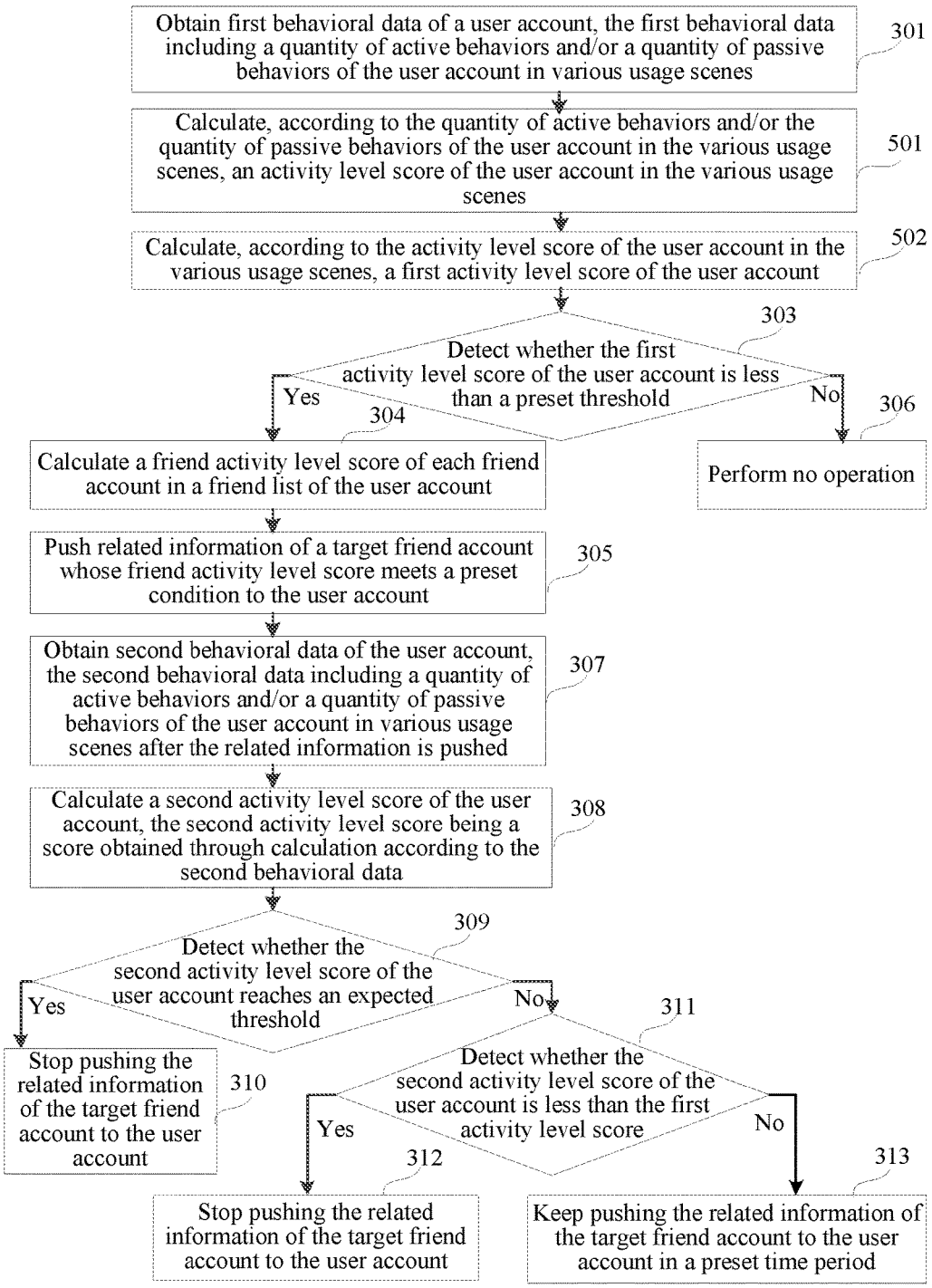
FIG. 5 is a method flowchart of substeps of step 302 in the embodiment of FIG. 3.

In another implementation, step 302 in the embodiment of FIG. 3 may be implemented by using the following steps shown in FIG. 5.

Step 501: Calculate, according to the quantity of active behaviors and/or the quantity of passive behaviors of the user account in the various usage occasions, an activity level score of the user account in the various usage occasions.

Optionally, the various usage occasions may include: a scene in which information is sent to/received from a specified object, for example, in which information is sent to/received from in a private chat session, in a group chat session, or via a drift bottle; and a scene in which information is sent to/received from an unspecified object, such as a scene of Moments in a WeChat application, a scene of a QQ zone in a QQ application, a scene in a microblog application, a scene in a Post Bar application.

An active behavior refers to a behavior that generates information in a usage occasion in an active manner. A passive behavior refers to a behavior caused in a usage occasion according to information that is generated by another user account.

Optionally, the active behavior may include: a behavior of sending information to a specified object, such as sending information to a friend privately, sending information in a group chat session, or sending a drift bottle; and a behavior of sending information to an unspecified object, such as sending a post in Moments, sending a post in a QQ zone, sending a post in a microblog, or publishing a topic in a Post Bar.

Optionally, the passive behavior may include: a behavior of receiving information sent by a specified object, such as receiving information sent by a friend, receiving information in a group chat session, or receiving a drift bottle; and a behavior of receiving information sent by an unspecified object, such as browsing a post in Moments, browsing a post in a QQ zone, browsing a post in a microblog, browsing a topic in a Post Bar, or publishing a comment on a post or on a topic.

An activity level score of the user account in an $i^{th}$ usage occasion may be obtained through calculation by using the following formula:

$$score_i = N_1*s1 + N_2*s2 + \ldots + N_j*sj;$$

where $N_1$ is a quantity of first behaviors in the $i^{th}$ usage occasion, s1 is a score corresponding to a single first behavior; $N_2$ is a quantity of second behaviors in the $i^{th}$ usage occasion, s2 is a score corresponding to a single second behavior; and $N_j$ is a quantity of $j^{th}$ behaviors in $i^{th}$ the usage occasion, sj is a score corresponding to a single $j^{th}$ behavior; and the $j^{th}$ behavior is an active behavior or an passive behavior, $score_i$ representing the activity level score of the user account in the $i^{th}$ the usage occasion, and i, $N_1$, $N_2$ and $N_j$ are positive integers.

For example, it is assumed that the user account is in a usage occasion in which information is sent to/received from a specified object. For example, a quantity of times that each behavior is in the usage occasion in which information is sent to/received from a specified object and a score that is represented by having the behavior once are shown in the following table:

TABLE 1

| Behavior | Send a message (a private chat) | Receive a message (a private chat) | Receive a message (a group chat) |
| --- | --- | --- | --- |
| A quantity of behaviors ($N_i$) | 20 | 25 | 50 |
| A score of a single behavior (si) | 1 | 0.2 | 0.01 |

According to the information shown in Table 1, an activity level score of the user account in the usage occasion in which information is sent to/received from a specified object is obtained through calculation and is:

$$score_i = N_1*s1 + N_2*s2 + N_3*s3 = 20*1 + 25*0.2 + 50*0.01 = 25.5$$

For example, it is assumed that the user account is in a usage occasion of Moments. For example, a quantity of times that each behavior is in the usage occasion of Moments and a score that is represented by having the behavior once are shown in the following table:

TABLE 2

| Behavior | Send a message in Moments | Comment | Praise in Moments | Browse |
| --- | --- | --- | --- | --- |
| A quantity of behaviors ($N_i$) | 20 | 30 | 40 | 50 |
| A score of a single behavior (si) | 1 | 0.2 | 0.05 | 0.01 |

According to the information shown in Table 2, the activity level score of the user account in the usage occasion of Moments is obtained through calculation and is:

$$\text{score}_2 = N_1 * s1 + N_2 * s2 + N_3 * s3 + N_4 * s4$$
$$= 20*1 + 30*0.2 + 40*0.05 + 50*0.01 = 28.5.$$

Step 502: Calculate, according to the activity level score of the user account in the various usage occasions, a first activity level score of the user account.

In this step, the first activity level score of the user account may be calculated by using the following two possible implementations.

In one possible implementation, the first activity level score of the user account is obtained by using the following formula:

$$y = m_1 * \text{score}_1 + m_2 * \text{score}_2 + \ldots + m_i * \text{score}_i;$$

where $m_1$, $m_2$, and $m_i$ are weight parameters and are positive numbers; $\text{score}_1$ is an activity level score of the user account in a first usage occasion, $\text{score}_2$ is an activity level score of the user account in a second usage occasion, and $\text{score}_i$ is the activity level score of the user account in the $i^{th}$ the usage occasion.

For example, it is assumed that the user account only has two usage occasions that are shown in Table 1 and Table 2 by way of example, and the weight parameters are $m_1=0.6$ and $m_2=0.4$. According to the activity level score that is of the user account in each usage occasion and that is obtained through calculation in Table 1 and Table 2, the first activity level score of the user account that is obtained through calculation is:

$$y = 0.6 * \text{score}_1 + 0.4 * \text{score}_2 = 0.6 * 25.5 + 0.4 * 28.5 = 26.7$$

In another possible implementation, the first activity level score of the user account is obtained by using the following formula:

$$y = \max(\text{score}_1, \text{score}_2, \ldots, \text{score}_i);$$

where $\text{score}_1$ is an activity level score of the user account in a first usage occasion, $\text{score}_2$ is an activity level score of the user account in a second usage occasion, and $\text{score}_i$ is the activity level score of the user account in the $i^{th}$ the usage occasion.

For example, according to the activity level score that is of the user account in each usage occasion and that is obtained through calculation in Table 1 and Table 2, the first activity level score of the user account that is obtained through calculation is:

$$y = \max(\text{score}_1, \text{score}_2) = \max(25.5, 28.5) = 28.5.$$

Optionally, in the embodiment of FIG. 3, the friend activity level score of each friend account in the friend list of the user account may be obtained through calculation by using the formula in step 501, and the second activity level score of the user account may be obtained through calculation by using any formula in step 502.

In this embodiment, the formulas in step 501 and step 502 are merely used as examples for description. Methods for calculating an activity level score of the user account in various usage occasions and a first activity level score of the user account are not specifically limited in the present disclosure.

The follows are apparatus embodiments of the present disclosure. For details not described in the apparatus embodiments, refer to the foregoing corresponding method embodiments.

Figure 6:
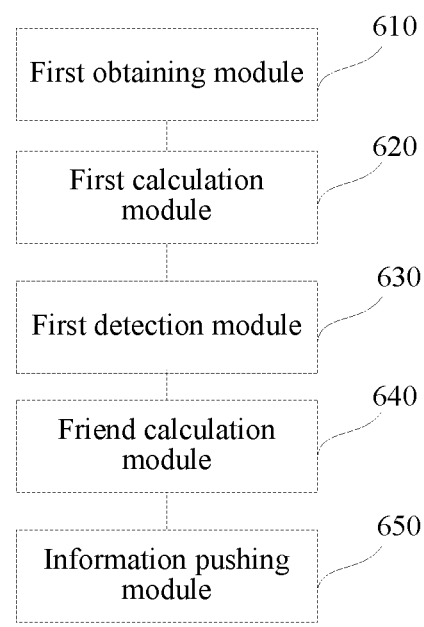
FIG. 6 is a structural block diagram of an information pushing apparatus according to an embodiment of the present disclosure.

Referring to FIG. 6, FIG. 6 is a structural block diagram of an information pushing apparatus according to an embodiment of the present disclosure. The information pushing apparatus provided in this embodiment may be implemented as all or a part of a server by using software, hardware, or a combination of hardware and software. The apparatus includes:

a first obtaining module 610, configured to obtain first behavioral data of a user account, the first behavioral data including a quantity of active behaviors and/or a quantity of passive behaviors of the user account in various usage occasions.

a first calculation module 620, configured to calculate a first activity level score of the user account, the first activity level score being a score obtained through calculation according to the first behavioral data;

a first detection module 630, configured to detect whether the first activity level score of the user account is less than a preset threshold;

a friend calculation module 640, configured to: when the first activity level score of the user account is less than the preset threshold, calculate a friend activity level score of each friend account in a friend list of the user account; and an information pushing module 650, configured to push related information of a target friend account whose friend activity level score meets a preset condition to the user account.

Based on the above, according to the information pushing apparatus provided in this embodiment, first behavioral data of a user account is obtained by a server; a first activity level score of the user account is calculated; whether the first activity level score of the user account is less than a preset threshold is detected; if the first activity level score of the user account is less than the preset threshold, a friend activity level score of each friend account in a friend list of the user account is calculated; and related information of a target friend account whose friend activity level score reaches a preset condition is pushed to the user account. Therefore, a problem is resolved that because information of a relatively few types is pushed to a user account by a server, it is difficult to meet interests and hobbies of all users, leading to that a large amount of the pushed information is accessed for a very few times, and an activity level of a user cannot be improved and resources of the server are wasted. Related information of a target friend list is pushed to a user account according to a social network attribute of the user account, so that access times of the pushed information are increased and an activity level of a user is improved, and resources of a server are prevented from being wasted.

Figure 7:
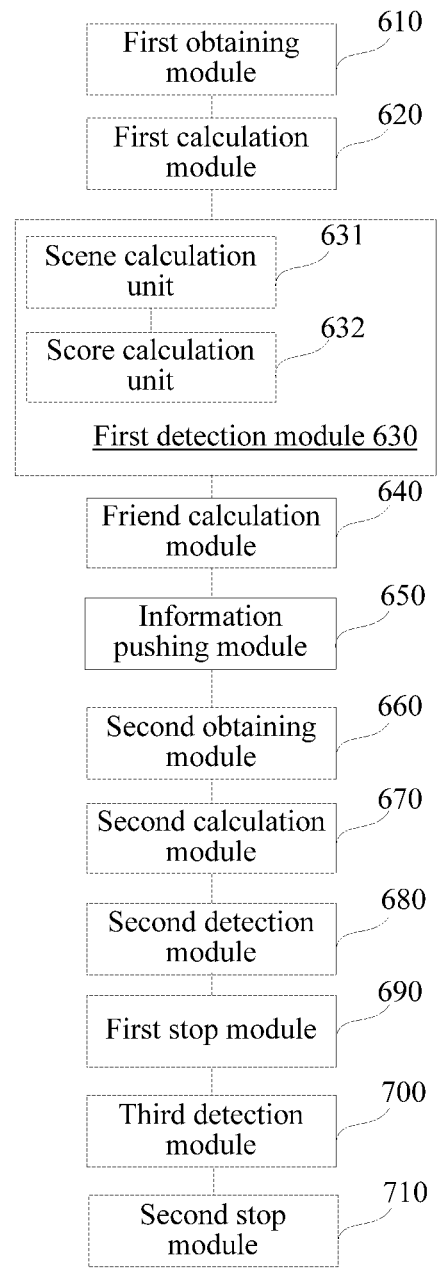
FIG. 7 is a structural block diagram of an information pushing apparatus according to another embodiment of the present disclosure.

Referring to FIG. 7, FIG. 7 is a structural block diagram of an information pushing apparatus according to another embodiment of the present disclosure. The information pushing apparatus provided in this embodiment may be implemented as all or a part of a server by using software, hardware, or a combination of hardware and software. The apparatus includes:

a first obtaining module 610, configured to obtain first behavioral data of a user account, the first behavioral data including a quantity of active behaviors and/or a quantity of passive behaviors of the user account in various usage occasions;

a first calculation module 620, configured to calculate a first activity level score of the user account, the first activity level score being a score obtained through calculation according to the first behavioral data;

a first detection module 630, configured to detect whether the first activity level score of the user account is less than a preset threshold.

a friend calculation module 640, configured to: when the first activity level score of the user account is less than the preset threshold, calculate a friend activity level score of each friend account in a friend list of the user account; and an information pushing module 650, configured to push related information of a target friend account whose friend activity level score meets a preset condition to the user account.

The related information includes at least one of a profile photo of the target friend account, a nickname of the target friend account, an account identifier of the target friend account, a personalized signature of the target friend account, active behavior information of the target friend account, or passive behavior information of the target friend account.

Optionally, the apparatus further includes:

a second obtaining module 660, configured to obtain second behavioral data of the user account, the second behavioral data including a quantity of active behaviors and/or a quantity of passive behaviors of the user account in various usage occasions after the related information is pushed;

a second calculation module 670, configured to calculate a second activity level score of the user account, the second activity level score being a score obtained through calculation according to the second behavioral data;

a second detection module 680, configured to detect whether the second activity level score of the user account reaches an expected threshold; and a first stop module 690, configured to: when the second activity level score of the user account reaches the expected threshold, stop pushing the related information of the target friend account to the user account.

Optionally, the apparatus further includes:

a third detection module 700, configured to detect whether the second activity level score of the user account is less than the first activity level score; and a second stop module 710, configured to: when the second activity level score of the user account is less than the first activity level score, stop pushing the related information of the target friend account to the user account.

Optionally, the first detection module 630 includes a scene calculation unit 631 and a score calculation unit 632.

The scene calculation unit 631 is configured to calculate, according to the quantity of active behaviors and/or the quantity of passive behaviors of the user account in the various usage occasions, an activity level score of the user account in the various usage occasions.

Optionally, the scene calculation unit 631 is configured to calculate the activity level score of the user account in the various usage occasions according to the following formula:

$$score_i = N_1 * s1 + N_2 * s2 + \ldots + N_j * sj,$$

where $N_1$ is a quantity of first behaviors in the $i^{th}$ usage occasion, s1 is a score corresponding to a single first behavior; $N_2$ is a quantity of second behaviors in the $i^{th}$ usage occasion, s2 is a score corresponding to a single second behavior; and $N_j$ is a quantity of $j^{th}$ behaviors in $i^{th}$ the usage occasion, sj is a score corresponding to a single $j^{th}$ behavior; and the $j^{th}$ behavior is an active behavior or an passive behavior, $score_i$ representing the activity level score of the user account in the $i^{th}$ the usage occasion, and i, $N_1$, $N_2$ and $N_j$ are positive integers.

The score calculation unit 632 is configured to calculate the first activity level score of the user account according to the activity level score of the user account in the various usage occasions.

Optionally, the score calculation unit 632 is configured to calculate the first activity level score of the user account according to the following formula:

$$y = m_1 * score_1 + m_2 * score_2 + \ldots + m_i * score_i;$$

Optionally, the score calculation unit 632 is configured to calculate the first activity level score of the user account according to the following formula:

$$y = \max(score_1, score_2, \ldots, score_i);$$

where $m_1$, $m_2$, and $m_i$ are weight parameters and are positive numbers; $score_1$ is an activity level score of the user account in a first usage occasion $score_2$ is an activity, level score of the user account in a second usage occasion, and $score_i$ is the activity level score of the user account in the $i^{th}$ the usage occasion.

Based on the above, in the information pushing method provided in this embodiment, first behavioral data of a user account is obtained by a server; a first activity level score of the user account is calculated; whether the first activity level score of the user account is less than a preset threshold is detected; if the first activity level score of the user account is less than the preset threshold, a friend activity level score of each friend account in a friend list of the user account is calculated; and related information of a target friend account whose friend activity level score reaches a preset condition is pushed to the user account. Therefore, a problem is resolved that because information of a relatively few types is pushed to a user account by a server, it is difficult to meet interests and hobbies of all users, leading to that a large amount of the pushed information is accessed for a very few times, and an activity level of a user cannot be improved and resources of the server are wasted. Related information of a target friend list is pushed to a user account according to a social network attribute of the user account, so that access times of the pushed information are increased and an activity level of a user is improved, and resources of a server are prevented from being wasted.

When the second activity level score of the user account reaches the expected threshold or when the second activity level score of the user account is less than the first activity level score, the server stops pushing the related information of the target friend account to the user account, so that harassment on the user account is reduced, and resources of the server are prevented from being wasted at the same time.

Figure 8:
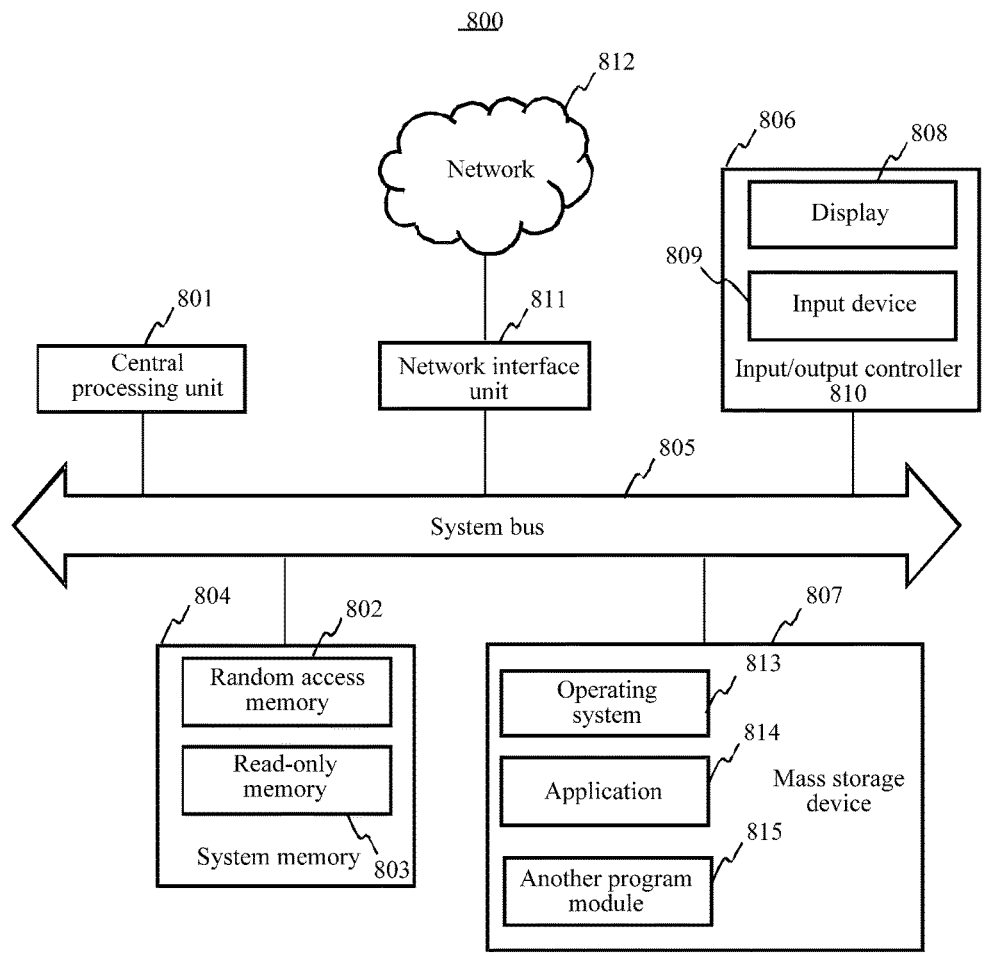
FIG. 8 is a structural block diagram of a server according to an embodiment of the present disclosure.

Referring to FIG. 8, FIG. 8 is a structural diagram of a server according to an embodiment of the present disclosure. The server 800 includes: a central processing unit (CPU) 801, a system memory 804 including a random access memory (RAM) 802 and a read-only memory (ROM) 803, and a system bus 805 connecting the system memory 804 to the central processing unit 801. The server 800 further includes a basic input/output system (I/O system) 806 used for transmitting information among components in a computer and a mass storage device 807 used for storing an operating system 813, an application 814, and another program module 815.

The basic input/output system 806 includes a display 808 used for displaying information and an input device 809 such as a mouse or a keyboard that is used for a user to input information. The display 808 and the input device 807 are connected to an input/output controller 810 of the system bus 805, to be connected to the central processing unit 801. The basic input/output system 806 may further include the input/output controller 810 used for receiving and processing input that is from multiple other devices, such as a keyboard, a mouse, and an electronic stylus. Similarly, the input/output controller 810 further provides output to a display screen, a printing machine, or an output device of another type.

The mass storage device 807 is connected to a mass storage controller (not shown) of the system bus 805, to be connected to the central processing unit 801. The mass storage device 807 and an associated computer readable medium provide non-volatile storage to the server 800. That is, the mass storage device 807 may include a computer readable medium (not shown), such as a hard disk or a CD-ROM drive.

Without loss of generality, the computer readable medium may include a computer storage medium and a communication medium. The computer storage medium includes a volatile and non-volatile, removable and non-removable medium that is implemented by using any method or technology used for storing information, such as a computer readable instruction, a data structure, a program module, or other data. The computer storage medium includes: solid-state storage device, such as a RAM, a ROM, an EPROM, an EEPROM, or a flash memory; optical storage, such as a CD-ROM, or DVD; and a magnetic storage device, such as a cassette, a tape, or magnetic storage. Certainly, persons skilled in the art may know that the computer storage medium is not limited to the foregoing types. The system memory 804 and the mass storage device 807 may be generally referred to as memories.

According to the embodiments of the present disclosure, the server 800 may be further connected to a remote computer on a network via a network such as the Internet to operate. That is, the server 800 may be connected to a network 812 by being connected to a network interface unit 811 on the system bus 805, or may be connected to a network of another type or a remote computer system (not shown) by using the network interface unit 811.

The memory further includes one or more programs. The one or more programs are stored in the memory, and the one or more programs are used for performing the information pushing method provided in the foregoing embodiments.

Persons of ordinary skill in the art may understand that all or part of the steps of the information pushing method in the foregoing embodiments may be implemented by a program instructing relevant hardware. The program may be stored in a computer readable storage medium, and the storage medium may be a read-only memory (ROM), a random access memory (RAM), a magnetic disk, an optical disk, or the like.

Figure 9:
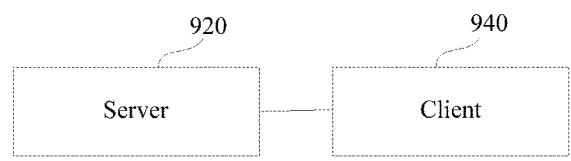
FIG. 9 is a structural block diagram of an information pushing system according to an embodiment of the present disclosure.

Referring to FIG. 9, FIG. 9 is a structural block diagram of an information pushing system according to an embodiment of the present disclosure. The system includes a server 920 and a client 940.

The server 920 includes the information pushing apparatus according to any one of the embodiments shown in FIG. 6 or shown in FIG. 7; or includes the server in the embodiment shown in FIG. 8.

The client 940 is configured to receive related information that is of a target friend account and that is pushed by the server 920.

First behavioral data of a user account is obtained by using a server; the server calculates a first activity level score of the user account; the server detects whether the first activity level score of the user account is less than a preset threshold; if the first activity level score of the user account is less than the preset threshold, the server calculates a friend activity level score of each friend account in a friend list of the user account; and the server pushes related information of a target friend account whose friend activity level score reaches a preset condition to the user account. Therefore, a problem is resolved that because information of a relatively few types is pushed to a user account by a server, it is difficult to meet interests and hobbies of all users, leading to that a large amount of the pushed information is accessed for a very few times, and an activity level of a user cannot be improved and resources of the server are wasted. Related information of a target friend list is pushed to a user account according to a social network attribute of the user account, so that access times of the pushed information are increased and an activity level of a user is improved, and resources of a server are prevented from being wasted.

It should be noted that when pushing information, the information pushing apparatus provided in the foregoing embodiments is merely described by using an example of division of the foregoing functional modules. During actual application, the foregoing functions may be allocated to different functional modules to be completed according to a requirement, that is, an inner structure of the apparatus is divided into different functional modules to complete all or some of the functions described above. In addition, the information pushing apparatus provided in the foregoing embodiments and the information pushing method embodiments fall within a same conception. For details of a specific implementation process, refer to the method embodiments. Details are not described again herein.

The sequence numbers of the foregoing embodiments of the present disclosure are merely for the convenience of description, and do not imply the preference among the embodiments.

Persons of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An information pushing method, applied to a server including at least a processor and a memory, comprising:
    obtaining first behavioral data of a user account, the first behavioral data comprising a first quantity of active behaviors and a first quantity of passive behaviors of the user account;
    calculating a first activity level score of the user account according to the first behavioral data;
    detecting whether the first activity level score of the user account is less than a preset threshold;
    if the first activity level score of the user account is less than the preset threshold, calculating a friend activity level score of each friend account in a friend list of the user account;

pushing related information of a target friend account whose friend activity level score meets a preset condition to the user account;

after pushing the related information of the target friend account, obtaining second behavioral data of the user account, the second behavioral data comprising a second quantity of active behaviors and a second quantity of passive behaviors of the user account after the related information is pushed;

calculating a second activity level score of the user account according to the second behavioral data;

detecting whether the second activity level score of the user account reaches an expected threshold;

if the second activity level score of the user account reaches the expected threshold, stopping pushing the related information of the target friend account to the user account;

detecting whether the second activity level score of the user account is less than the first activity level score; and if the second activity level score of the user account is less than the first activity level score, stopping pushing the related information of the target friend account to the user account.

2. The method according to claim 1, wherein calculating the first activity level score of the user account further comprises:

calculating, according to active behaviors and passive behaviors of the user account in each usage occasion, an activity level score of the user account in the corresponding usage occasion, to obtain activity level scores of the user account in multiple usage occasions; and calculating the first activity level score of the user account according to the activity level scores of the user account in the multiple usage occasions.

3. The method according to claim 2, wherein the calculating an activity level score of the user account comprises:

calculating an activity level score of the user account in an $i^{th}$ usage occasion according to the following formula:

$$score_i = N_1 * s1 + N_2 * s2 + \ldots + N_j * sj$$

$N_1$ being a quantity of first behaviors in the $i^{th}$ usage occasion, s1 being a score corresponding to a single first behavior; $N_2$ being a quantity of second behaviors in the $i^{th}$ usage occasion, s2 being a score corresponding to a single second behavior; and $N_j$ being a quantity of $j^{th}$ behaviors in $i^{th}$ the usage occasion, sj being a score corresponding to a single $j^{th}$ behavior; and the $j^{th}$ behavior being an active behavior or an passive behavior, $score_i$ representing the activity level score of the user account in the $i^{th}$ the usage occasion, and i, $N_1$, $N_2$, and $N_j$ being positive integers.

4. The method according to claim 2, wherein the calculating the first activity level score of the user account according to the activity level score of the user account in the various usage occasions comprises:

calculating the first activity level score of the user account according to the following formula:

$$y = m_1 * score_1 + m_2 * score_2 + \ldots + m_i * score_i; \text{ or}$$

calculating the first activity level score of the user account according to the following formula:

$$y = \max(score_1, score_2, \ldots, score_i);$$

$m_1$, $m_2$, and $m_i$ being weight parameters and being positive numbers; $score_1$ being an activity level score of the user account in a first usage occasion, $score_2$ being an activity level score of the user account in a second usage occasion, and $score_i$ the activity level score of the user account in the $i^{th}$ the usage occasion.

5. The method according to claim 1, wherein the related information comprises at least one of a profile photo of the target friend account, a nickname of the target friend account, an account identifier of the target friend account, a personalized signature of the target friend account, active behavior information of the target friend account, or passive behavior information of the target friend account.

6. A server, comprising: a processor, a memory, and a network interface unit, the memory storing one or more program instructions, and the processor being configured to execute the one or more program instructions; wherein the network interface unit is configured to obtain first behavioral data of a user account, the first behavioral data comprising a first quantity of active behaviors and a first quantity of passive behaviors of the user account;

the processor is configured to:
calculate a first activity level score of the user account according to the first behavioral data;
detect whether the first activity level score of the user account is less than a preset threshold; and
if the first activity level score of the user account is less than the preset threshold, calculate a friend activity level score of each friend account in a friend list of the user account;

the network interface unit is further configured to:
push related information of a target friend account whose friend activity level score meets a preset condition to the user account; and
obtain second behavioral data of the user account, the second behavioral data comprising: a second quantity of active behaviors and a second quantity of passive behaviors of the user account after the related information is pushed;

the processor is further configured to:
calculate a second activity level score of the user account according to the second behavioral data;
detect whether the second activity level score of the user account reaches an expected threshold; and
detect whether the second activity level score of the user account is less than the first activity level score; and the network interface unit is further configured to:
when the second activity level score of the user account reaches the expected threshold, stop pushing the related information of the target friend account to the user account; and
when the second activity level score of the user account is less than the first activity level score, stop pushing the related information of the target friend account to the user account.

7. The server according to claim 6, wherein the processor is further configured to:

calculate, according to active behaviors and passive behaviors of the user account in each usage occasion, an activity level score of the user account in the corresponding usage occasion, to obtain activity level scores of the user account in multiple usage occasions; and calculate the first activity level score of the user account according to the activity level score of the user account in the multiple usage occasions.

8. The server according to claim 7, wherein
the processor is further configured to calculate an activity level score of the user account in an $i^{th}$ usage occasion according to the following formula:

$$score_i = N_1 * s1 + N_2 * S2 + \ldots + N_j * sj$$

$N_1$ being a quantity of first behaviors in the $i^{th}$ usage occasion, s1 being a score corresponding to a single first behavior; $N_2$ being a quantity of second behaviors in the $i^{th}$ usage occasion, s2 being a score corresponding to a single second behavior; and $N_j$ being a quantity of $j^{th}$ behaviors in $i^{th}$ the usage occasion, sj being a score corresponding to a single $j^{th}$ behavior; and the $j^{th}$ behavior being an active behavior or an passive behavior, $score_i$ representing the activity level score of the user account in the $i^{th}$ the usage occasion, and i, $N_1$, $N_2$, and $N_j$ being positive integers.

9. The server according to claim 7, wherein the processor is further configured to:
calculate the first activity level score of the user account according to the following formula:

$$y = m_1 * score_1 + m_2 * score_2 + \ldots + m_i * score_i;\ or$$

calculate the first activity level score of the user account according to the following formula:

$$y = \max(score_1, score_2, \ldots, score_i);$$

$m_1$, $m_2$, and $m_i$ being weight parameters and being positive numbers; $score_1$ being an activity level score of the user account in a first usage occasion, $score_2$ being an activity level score of the user account in a second usage occasion, and $score_i$ being the activity level score of the user account in the $i^{th}$ the usage occasion.

10. The server according to claim 6, wherein the related information comprises at least one of a profile photo of the target friend account, a nickname of the target friend account, an account identifier of the target friend account, a personalized signature of the target friend account, active behavior information of the target friend account, or passive behavior information of the target friend account.

11. A non-transitory computer-readable storage medium containing computer-executable program for, when being executed by a processor, implementing an information pushing method, the method comprising:
obtaining first behavioral data of a user account, the first behavioral data comprising a first quantity of active behaviors and a first quantity of passive behaviors of the user account;
calculating a first activity level score of the user account according to the first behavioral data;
detecting whether the first activity level score of the user account is less than a preset threshold;
if the first activity level score of the user account is less than the preset threshold, calculating a friend activity level score of each friend account in a friend list of the user account;
pushing related information of a target friend account whose friend activity level score meets a preset condition to the user accounts;
after pushing the related information of the target friend account, obtaining second behavioral data of the user account, the second behavioral data comprising a second quantity of active behaviors and a second quantity of passive behaviors of the user account after the related information is pushed;
calculating a second activity level score of the user account according to the second behavioral data;
detecting whether the second activity level score of the user account reaches an expected threshold;
if the second activity level score of the user account reaches the expected threshold, stopping pushing the related information of the target friend account to the user account;
detecting whether the second activity level score of the user account is less than the first activity level score; and
if the second activity level score of the user account is less than the first activity level score, stopping pushing the related information of the target friend account to the user account.

12. The storage medium according to claim 11, wherein calculating the first activity level score of the user account further comprises:
calculating, according to active behaviors and passive behaviors of the user account in each usage occasion, an activity level score of the user account in the corresponding usage occasion, to obtain activity level scores of the user account in multiple usage occasions; and
calculating the first activity level score of the user account according to the activity level scores of the user account in the multiple usage occasions.

13. The storage medium according to claim 12, wherein the calculating an activity level score of the user account comprises:
calculating an activity level score of the user account in an $i^{th}$ usage occasion according to the following formula:

$$score_i = N_1 * s1 + N_2 * s2 + \ldots + N_j * sj$$

$N_1$ of first behaviors in the $i^{th}$ usage occasion, s1 being a score corresponding to a single first behavior; $N_2$ being a quantity of second behaviors in the $i^{th}$ usage occasion, s2 being a score corresponding to a single second behavior; and $N_j$ being a quantity of $j^{th}$ behaviors in $i^{th}$ the usage occasion, sj being a score corresponding to a single $j^{th}$ behavior; and the $j^{th}$ behavior being an active behavior or an passive behavior, $score_i$ representing the activity level score of the user account in the $i^{th}$ the usage occasion, and i, $N_1$, $N_2$, and $N_j$ being positive integers.

14. The storage medium according to claim 12, wherein the calculating the first activity level score of the user account according to the activity level score of the user account in the various usage occasions comprises:
calculating the first activity level score of the user account according to the following formula:

$$y = m_1 * score_1 + m_2 * score_2 + \ldots + m_i * score_i;\ or$$

calculating the first activity level score of the user account according to the following formula:

$$y = \max(score_1, score_2, \ldots, score_i);$$

$m_1$, $m_2$, $m_i$ being weight parameters and being positive numbers; $score_1$ being an activity level score of the user account in a first usage occasion, $score_2$ being an activity level score of the user account in a second usage occasion, and $score_i$ being the activity level score of the user account in the $i^{th}$ the usage occasion.

* * * * *